United States Patent [19]

Nigawara et al.

[11] Patent Number: 5,249,260
[45] Date of Patent: Sep. 28, 1993

[54] DATA INPUT SYSTEM

[75] Inventors: Seiitsu Nigawara; Shigeaki Namba, both of Hitachi, Japan

[73] Assignee: Hitachi, Ltd., Tokyo, Japan

[21] Appl. No.: 796,886

[22] Filed: Nov. 25, 1991

Related U.S. Application Data

[63] Continuation of Ser. No. 391,193, Aug. 9, 1989.

[30] Foreign Application Priority Data

Aug. 12, 1988 [JP] Japan .................. 63-199906

[51] Int. Cl.⁵ ..................... G06F 15/18; G06F 15/60
[52] U.S. Cl. ........................... 395/51; 395/54; 395/600; 395/907
[58] Field of Search ............ 395/51, 54, 600, 907

[56] References Cited

U.S. PATENT DOCUMENTS

| | | | |
|---|---|---|---|
| 4,628,435 | 12/1986 | Tashiro et al. | 364/513 |
| 4,642,782 | 2/1987 | Kemper et al. | 364/513 |
| 4,649,515 | 3/1987 | Thompson et al. | 364/184 |
| 4,670,848 | 6/1987 | Schramm | 364/513 |
| 4,713,775 | 12/1987 | Scott et al. | 364/421 |
| 4,752,889 | 6/1988 | Rappaport et al. | 364/513 |
| 4,754,410 | 6/1988 | Leech et al. | 364/513 |
| 4,829,450 | 5/1989 | Manthey | 364/513 |
| 4,849,879 | 7/1989 | Chinnaswamy et al. | 364/513 |
| 4,853,873 | 8/1989 | Tsuji et al. | 364/513 |
| 4,864,492 | 9/1989 | Blakely-Fogel et al. | 364/513 |
| 4,866,635 | 9/1989 | Kahn et al. | 364/900 |
| 4,868,763 | 9/1989 | Masui et al. | 364/513 |
| 4,884,218 | 11/1989 | Agnew et al. | 395/54 |
| 4,916,633 | 4/1990 | Tychonievich et al. | 364/513 |
| 4,918,620 | 4/1990 | Ulug | 364/513 |
| 4,926,343 | 5/1990 | Tsuruta et al. | 364/513 |
| 4,931,951 | 6/1990 | Murai et al. | 395/51 |
| 4,937,755 | 6/1990 | Yokota et al. | 364/513 |

OTHER PUBLICATIONS

"Rule-Based System", Roth et al., Comm. of the ACM, Sep. 1985.
*Future Generations Computer Systems*, "Efficient Processing of Integrity Constraints in Deductive Databases", by P. S. Sheu, et al., vol. 3, No. 3, Sep. 1987, Amsterdam, NL.
*Proceedings IEEE International Automatic Testing Conference*, "Solutions to Database Corruption", by S. R. Greenspan, Nov. 3, 1987, San Francisco, Calif.

*Primary Examiner*—Allen R. MacDonald
*Assistant Examiner*—George Davis
*Attorney, Agent, or Firm*—Antonelli, Terry, Stout & Kraus

[57] ABSTRACT

In an expert system of an operating system e.g. an industrial plant it is desired to input data in the form of relationships between operating parameters of the system to a database. However, if such data are input by inexperienced users, there is the possibility of incorrect data being input. Therefore, a memory stores a plurality of fundamental rules, each being a predetermined relationship between the operating parameters. Then when a datum is input, the fundamental rule(s) corresponding to the operating parameters of the datum are investigated, and the datum is transmitted to the database when each such corresponding fundamental rule is satisfied. In a further development, prevent transmitting datum to a database when each such corresponding fundamental rule is not satisfied.

12 Claims, 10 Drawing Sheets

$P_1 \geq P_2 \geq P_3 (P_3')$ $P_3 \geq P_4 \geq P_6$ $T_1 \geq T_2 \geq T_3 (T_3')$ $T_3 \geq T_4 \geq T_6$ $Ta > Tb$      $Tc > Tb$ FIG. 4(a)
FIG. 4(b)
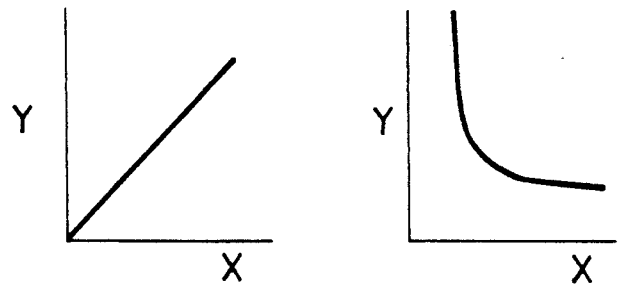
FIG. 4(c)
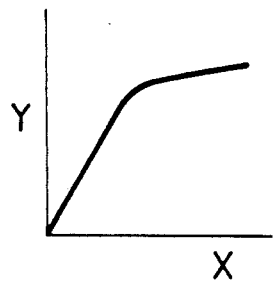
FIG. 4(d)
| X | Y | CORRELATION EQUATION |
|---|---|---|
|   |   |   |
|   |   |   |
|   |   |   |
|   |   |   |

FIG. 5(a) ANOMALY PROCESS DATA UNDER SURVEILLANCE

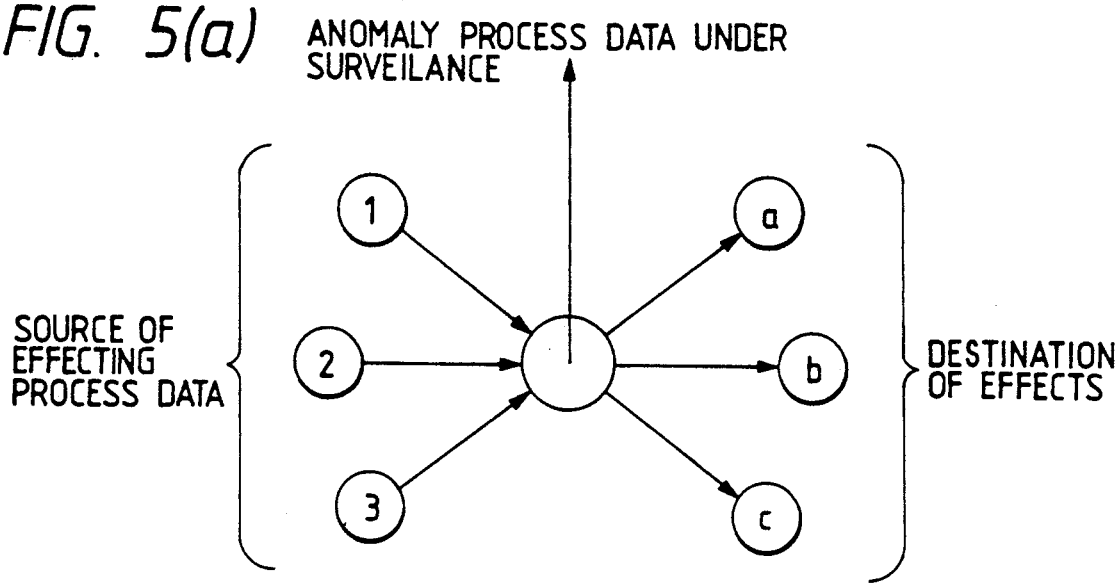

FIG. 5(b)

| ANOMALY PROCESS DATA UNDER SURVEILANCE ||
| SOURCE OF EFFECTS | DESTINATION OF EFFECTS |
| --- | --- |
| 1 | a |
| 2 | b |
| 3 | c |

FIG. 6

| CASE | THE OPERATION STATE OF A PLANT | THE OPERATION STATE OF OPERATION TERMINAL |
| --- | --- | --- |
| INDIVIDUAL OPERATION TERMINAL | NORMAL | VALVE A IS CORRECTLY OPENED |
| | ANOMALY | VALVE A IS CORRECTLY CLOSED |
| GROUP OPERATION TERMINAL | NORMAL | VALVE A IS CORRECTLY OPENED<br>VALVE B IS CORRECTLY CLOSED |
| | ANOMALY | VALVE A IS CORRECTLY CLOSED<br>VALVE B IS CORRECTLY OPENED |

FIG. 8

| NO. | DIVIDED SYSTEM PROCESSES | | FUNDAMENTAL RULE | THE CONCEPTS FOR EXTRACTING THE RULES |
|---|---|---|---|---|
| 1 | INTRINSIC FOR EQUIPMENTS | | HEATER BLEED VALVE IS ALWAYS IN THE PERFECTLY OPENED STATE DURING NORMAL PLANT OPERATION | D·FIG. 6 |
| 2 | BETWEEN EQUIPMENT | | THE OPENING / CLOSING STATES OF THE HEATER'S OUTLET VALVE AND INLET VALVE ARE THE SAME | D·FIG. 6 |
| 3 | IN A SINGLE PROCESS | 1 | THE INLET AND OUTLET VALVES ARE PERFECTLY OPENED AND A BYPASS VALVE IS PERFECTLY CLOSED DURING NORMAL PLANT OPERATION | D·FIG. 6 |
| | | 2 | THE INLET AND OUTLET VALVES ARE PERFECTLY CLOSED AND THE BYPASS VALVE IS PERFECTLY OPENED DURING ANORMALY PLANT OPERATION | D·FIG. 6 |
| | | 3 | THE FEEDWATER FLOW RATE AT NO. (N) HEATER OUTLET IS EQUAL TO THE FEEDWATER FLOW RATE AT THE HEATER INLET AT A CONSTANT WATER LEVEL IN THE HEATER | A·FIG. 3 |
| 4 | BETWEEN SINGLE PROCESSES | 1 | THE FEEDWATER TEMPERATURE AT NO. (N) HEATER'S OUTLET IS LOWER THAN THE FEEDWATER TEMPERATURE AT NO. (N+1) HEATER'S OUTLET | A·FIG. 3 |
| | | 2 | THE FEEDWATER PRESSURE AT NO. (N) HEATER'S OUTLET IS HIGHER THAN THE FEEDWATER PRESSURE AT NO. (N+1) HEATER'S OUTLET | A·FIG. 3 |
| 5 | IN SUBPROCESS | 1 | THE SUM OF THE BLEED FLOW RATE OF A HIGH-PRESSURE HEATER GROUP IS EQUAL TO THE DRAIN FLOW RATE OF THE FINAL STAGE HEATER WITH A CONSTANT WATER LEVELI IN THE HEATER | A·FIG. 3 |
| | | 2 | THE TOTAL RISING VALUE OF FEEDWATER TEMPERATURE IN EACH HIGH-PRESSURE HEATER EXCEEDS A CERTAIN SET VALUE Ts | B·FIG. 4 |
| 6 | BETWEEN SUBPROCESSES | | — | — |
| 7 | IN MAIN PROCESS | | A LINEAR RELATION EXISTS BETWEEN THE FEEDWATER FLOW RATE AT THE HIGH-PRESSURE HEATER'S OUTLET AND THE MAIN STEAM FLOW RATE | B·FIG. 4 |
| 8 | BETWEEN MAIN PROCESSES | 1 | POWER GENERATOR OUTPUT IN A PLANT THAT PERMITS HEATER CUT OPERATION NAY INCREASE BY 5% DURING OPERATION | B·FIG. 4 |
| | | 2 | THE SOURCE OF EFFECTS (HEATER BLEED VALVE OPENING DEGREE,---) THE DESTINATION OF EFFECTS (Mw,---) | C·FIG. 5 |

FIG. 9

| PROCESS DATA | RULE NO. | RELATED PROCESS DATA | CORRELATION |
|---|---|---|---|
| I1A<br>HEATER BLEED VALVE OPENING DEGREE | R1 | I2A, I4D, I5D, I3A<br>I2A : HIGH-PRESSURE HEATER BLEED FLOW RATE<br>I4D : MASTER TRIP RELAY RESET SIGNAL<br>I5D : ALARM RESET SIGNAL<br>I3A : GENERATOR OUTPUT SIGNAL | |
| I4A<br>HIGH-PRESSURE HEATER OUTLET FEEDWATER FLOW RATE | R2 | I4'A, I5A, I6A, I7A<br>I5A : MAIN STEAM FLOW RATE<br>I6A : MAIN STEAM PRESSURE<br>I7a : MAIN STEAM TEMPERATURE<br>I4'A = $\|I4A - I5A * I6A * I7A\|$ : FLOW RATE DEVIATION | $\|I4A - I5A * I6A * I7A\|$<br>$\leq C4A * I3A$<br>$C4A$ : CONST |
| | R3 | I8A, I9A<br>I8A : HIGH-PRESSURE HEATER INLET FEEDWATER FLOW RATE<br>I9A : HIGH-PRESSURE HEATER WATER LEVEL | $\|I4A - I8A\|$<br>$\leq C9A * I9A$<br>$C9A$ : CONST |

FIG. 10

| MANAGEMENT HISTORY ||||||
|---|---|---|---|---|---|
| DATE | NAME | QUALIFICATION | LOAD | TEMPERATURE | HUMIDITY |
| INPUT KNOWLEDGE-BASE INFORMATION ||| RENEWAL KNOWLEDGE-BASE INFORMATION |||
| 1988-4-20 | A | 1 | 75% | 18°C | 60% |
| — ||| IF $(A > K_1)$<br>THEN $(C > K_2)$ |||
| | | | | | |
| | | | | | |

CAREER + DATA TYPES

FIG. 12
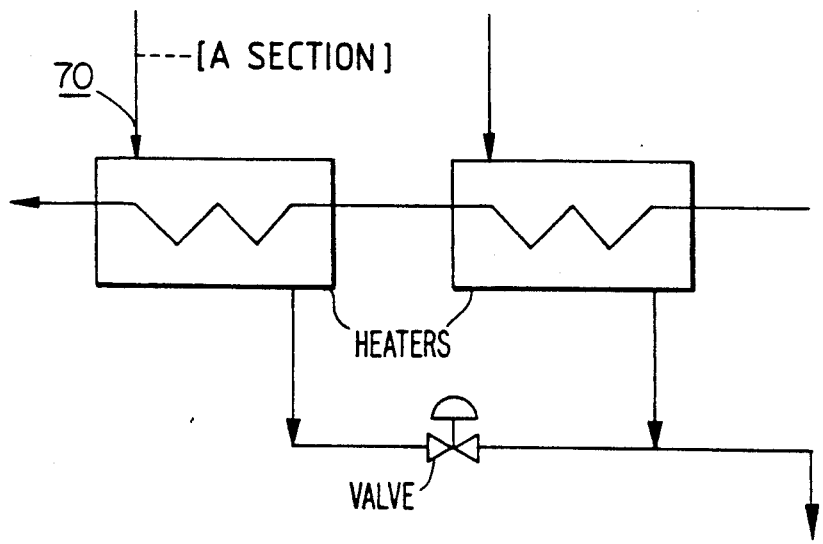
HIGHER THAN 300° ; RED
HIGHER THAN 100° ; ORANGE
HIGHER THAN    0° ; WHITE
PROCESS TYPE
APPOINTMENT
PROCESS SECTION
APPOINTMENT
STEAM
A SECTION
FIG. 14
OPERATOR INPUT
REGISTRATION
IN THE DATA BASE
T = T0
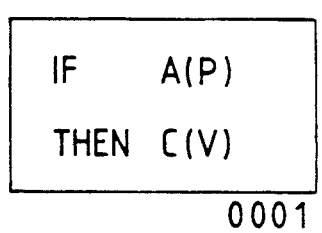
0001
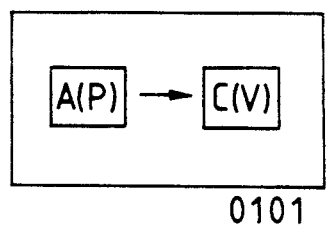
0101
T = T0 + T1
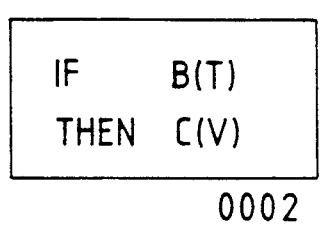
0002
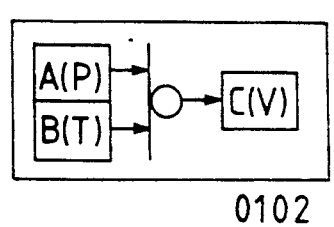
0102

DATA INPUT SYSTEM

This application is a continuation of application Ser. No. 07/391,193, filed on Aug. 9, 1989.

BACKGROUND OF THE INVENTION

1. Field of the Invention

The present invention relates to a data input system for inputting data to a database.

2. Summary of the Prior Art

It is now becoming increasingly common for an operating system, such as in industrial plant, to be operated on the basis of an "expert system" which operates on the basis of data stored in a database. It is generally accepted that a database used in an expert system is part of a "growing system", because the data is constantly being increased or changed, by actual operation of the system by the user, so that no final completion is ever achieved.

In such a system, the data represents relationships, and in this specification the term data (or information) refers to an operating relationship between operating parameters of the operating system. Those parameters may be operating conditions, process variables, or fixed values.

Some of that data may be initially input to the system (stored in the database) by the manufacturer of the system and therefore the validity of the data may be determined before the system is in operation. However, when the system is in operation, further data must be manually entered into the database by an operator and it is therefore necessary to ensure the integrity and validity of such data. Furthermore, differences may develop between the data initially stored in the database and the data that is actually used after, perhaps, years of operation of the system. These factors can result in invalid data within the system, which is to be avoided.

When considering these two factors, various arrangements have been proposed to try to overcome them. In Japanese Patent Application No. 60-41128, the data input by several operators is first passed to a database administrator, who is trained to determine which data can be stored in the database. This system, of course, requires that the database administrator be fully aware of the correct operating relationships, and the level of training needed for this is a limit to the practicality of this proposal.

The problem of the development of invalid data over a period of time was considered by Japanese Patent Application No. 58-192161, in which "age" information is associated with the data being input, and the data is automatically deleted after expiration of a predetermined age limit. This is also not a satisfactory solution, since valid data, which may subsequently be useful, will be deleted if it has reached its age limit.

Thus, neither of these two proposals adequately face the problem of input of invalid data, and this provides a limit to the practicality of the use of databases in such expert systems.

SUMMARY OF THE INVENTION

The present invention proposes that the data input system stores therein "fundamental rules" which are compared with the data being input. Each of the fundamental rules is a predetermined relationship between the operating parameters of the operating system, and thus it becomes possible to check, for any given datum, which of the fundamental rules corresponds to those operating parameters, and which of the fundamental rules are satisfied by the data being input. In this way, it becomes possible to determine if the data is valid and the datum can be transmitted to the database when every corresponding fundamental rule is satisfied, or transmission can be prevented if any corresponding fundamental rule is not satisfied.

Thus, many fundamental rules between the operating parameters and the operating system may be stored in a suitable memory, and when a new datum is input, the first step is to determine which operating parameters are used in the operating relationship of the datum, and to extract all the fundamental rules defining relationships between those operating parameters. Then, the datum can be compared with those fundamental rules to see if it is valid.

If those fundamental rules are satisfied, the datum is valid and similarly if any is not satisfied, the datum is invalid.

It can occur, however, that for a given datum, there are no corresponding fundamental rules (because the relationship between the operating parameters required by the datum have not been predefined). In this case, the system cannot directly determine the validity or invalidity of the datum, and then it may be necessary for a skilled operator to determine whether that datum should be input or not (such a datum being hereinafter referred to as a "reserved" datum). To ensure that only a sufficiently trained operator can cause a reserved datum to be input to the database, the input of the system may associate a plurality of priorities to the users of the system, and permit transmission of a reserved datum only when the user has a predetermined priority (e.g. corresponding to a trained operator).

Furthermore, the system may have a management history table which records the history of input of the data, so that if subsequently a given datum or data is found to be invalid, it becomes possible for that data to be extracted by determining when the datum or data was input in terms of the management history of the data. Thus, any incorrect data can be easily updated or deleted on the basis of the history of the database.

The present invention is applicable to any database in which the data represents operating relationships. It is particularly concerned with a data input system for operating an industrial plant, but may also be applicable to other situations such as medical databases.

BRIEF DESCRIPTION OF THE DRAWINGS

An embodiment of the invention will now be described in detail by way of example, with reference to the accompanying drawings in which:

FIGS. 4(i a), 4(b) 4(c) and 4(d) show the relationship between two processed items;

FIGS. 5(a) and 5(b) show the influence of process data;

FIG. 6 shows a table illustrating operation states;

FIG. 8 shows examples of fundamental rules;

FIG. 9 shows the organisation of fundamental rules;
FIG. 10 shows a management history table;
FIG. 12 shows how history from the history management table is displayed on a screen;
FIG. 14 shows a form for registration of data.

DETAILED DESCRIPTION

Figure 1:
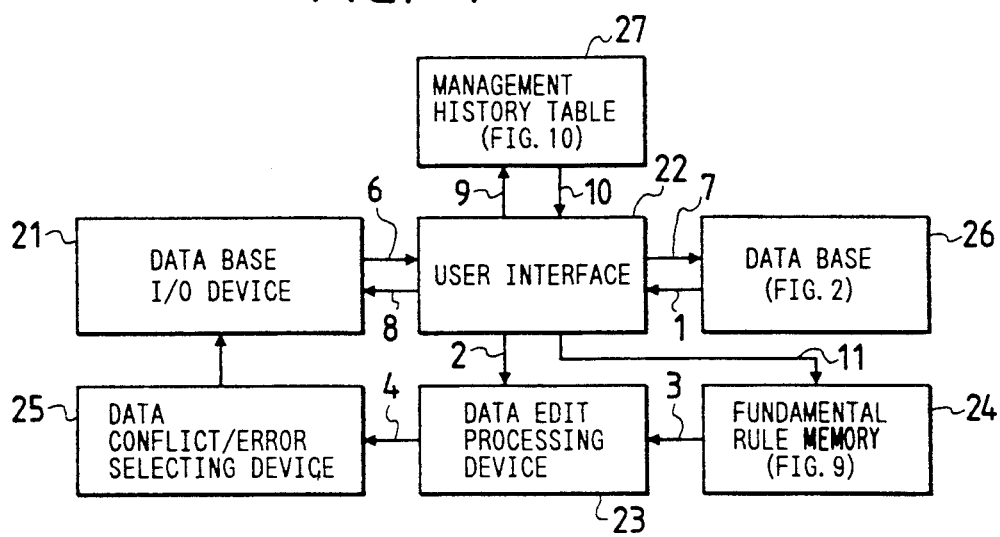
FIG. 1 shows block diagram of a data input system being an embodiment of the present invention.

FIG. 1 shows the schematic configuration of a data input/control system of an informational database according to an embodiment of the present invention.

In FIG. 1, a database input/output (I/O) device 21 is connected via a user interface 22 to a database 26. The connection between database I/O device 21 and the user interface is illustrated by buses 6, 8, and the connection between the user interface 22 and the database 26 is illustrated by buses 1, 7. The user interface 22 is connected via buses 9, 10 to a management history table 27 which records history of data input through the system by I/O device 21. Indeed, as will be described later, it is also possible to display history information on a display of the I/O device 21 from the management history table 27 when desired.

FIG. 1 also illustrates that the user interface 22 is connected to a fundamental rule memory 24, which stores the relationships (fundamental rules) which are predetermined between the operating parameters of the operating system. When data is input from the I/O device 21, the fundamental rules relating to the corresponding operating parameters are extracted from the fundamental rule memory 24 via the data edit processing device 23, and transmitted via a conflict/error selecting device 25 and hence to the I/O device 21. The data edit processing device 23 compares the data with the corresponding fundamental rules to determine whether the data conforms to the relationship established within the fundamental rules, and conflicting or erroneous data can be extracted by the selecting device 25. Then, the user only stores the data whose validity has been confirmed in the database 26 by suitable operation of the I/O device 21.

The operation of the system of FIG. 1 will be described in more detail later. Before doing that, however, the detailed structure and effects of the fundamental rule memory 24, the database 26, and the management history table 27 will be discussed.

1. Fundamental Rule Memory 24

The structure and concept of the fundamental rule section 24 will be described using a thermal power plant as an example of an object system operated by an expert system utilizing data base 26.

Figure 7:
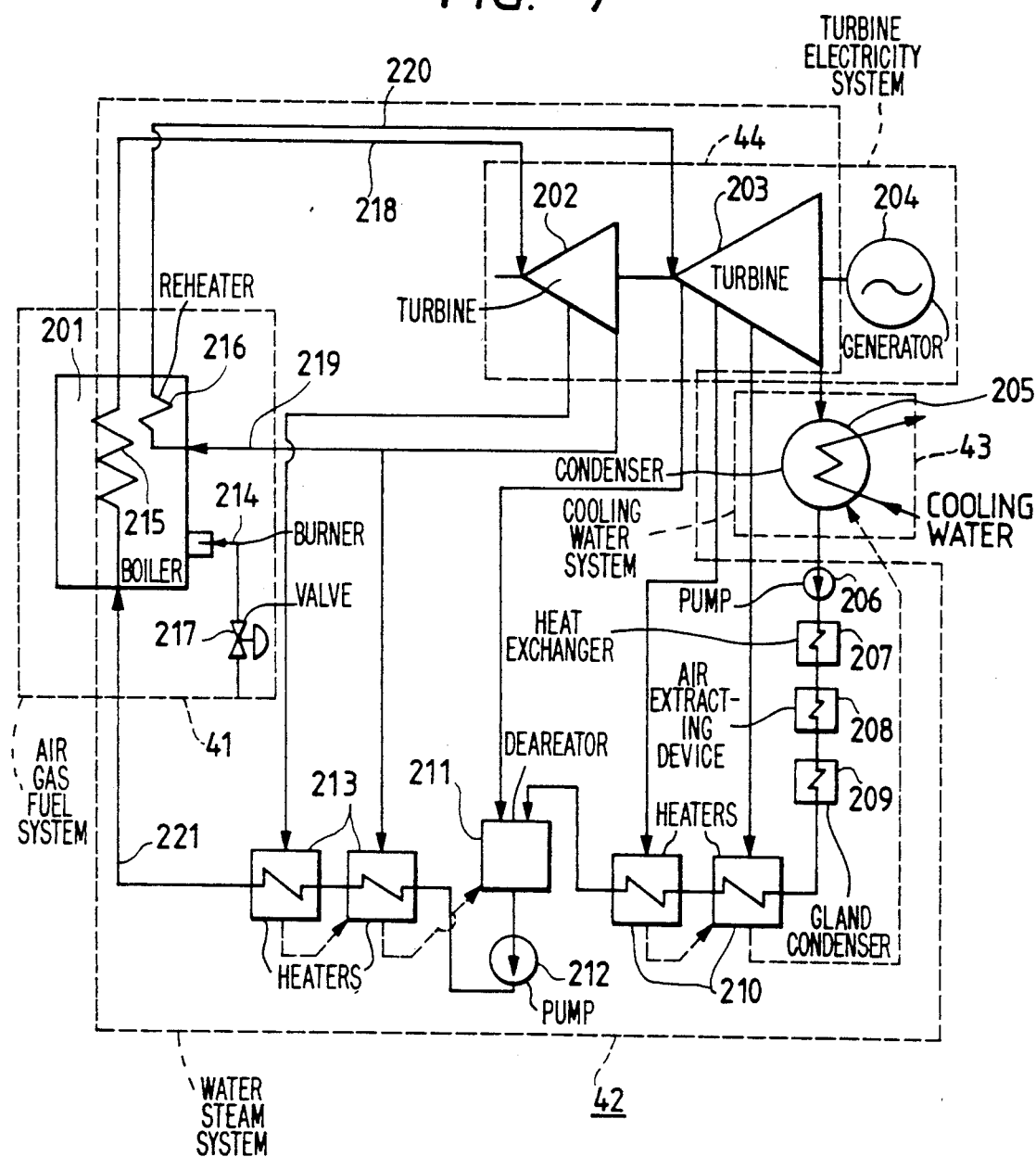
FIG. 7 shows a block diagram of a thermal power plant which may be operated on the basis of a system according to the present invention.

FIG. 7 shows the typical configuration of a thermal power plant. As shown in FIG. 7 steam generated in a boiler 201 is sent to a high-pressure turbine 202 through a main steam pipe 218. Some of the thermal energy of the steam is converted into mechanical energy to drive a generator 204. The steam that operates high-pressure turbine 202 passes through a low-temperature reheated steam pipe 219, is heated again in reheater 216 then is sent to reheated turbine 203 through a high-temperature reheated steam pipe 220 for subsequent operation. The steam that operates reheated turbine 203 is sent (in steam form) to a condenser 205, is cooled by cooling water (such as sea water), then condenses into water. The condensate is pumped up by condensate pump 206, which performs thermal recovery through heat exchangers such as condensate heat exchanger 207, air extracting device 208, and gland condenser 209. The temperature of the condensate is raised by a low-pressure feedwater-heating device 210 and deareating device 211. The temperature of the feedwater (whose pressure is increased in boiler feedwater pump 212) is further raised in a high pressure feedwater-heating device 213. This feedwater is then supplied to the boiler 201 through a main feedwater pipe 221. The feedwater in the high-pressure feedwater-heating device 213, deaerator 211, and low-pressure feedwater-heating device 210 is heated by the bled air of the turbine. In the boiler, the fuel is controlled by a fuel adjusting valve 217 as it passes through a fuel burner 214, then the necessary amount of air is added to the fuel for combustion in a furnace.

The feedwater receives the heat radiated by this combustion, converts it into steam, which is superheated in superheating device 215 and sent to the turbine. The fundamental rules previously prepared and stored in fundamental rule section 24 will be described in respect of the casual relations established between the various process data on the above-described thermal power plant (object system). Section 1—1 below discusses the extraction of the casual relations established in the object system; Section 1-2 describes the concept for extracting all casual relationships. Note that the process data used in extracting the casual relationships may be in analog or digital form.

1—1. Extracting Casual Relationships

A) Note the directions in which the liquid and heat flow in this process (see FIG. 3).

This directional flow is necessary in such processes. The flow of such liquids as water, condensed steam, oil and gas and the flow of heat and electricity are considered normal in plant operation, especially when the relation accompanying the flow is specified. The rules relating to flow rate, pressure, temperature, and heat are described below. FIG. 3 (a) shows a piping system of the object. The high-temperature, high-pressure fluid source is shown on the left of the figure and a branched fluid consumption part is shown on the right. When considering such a simplified piping system, the following relationship exists for the flow rate, pressure, and temperature at each point I-IX.

Figure 3A:
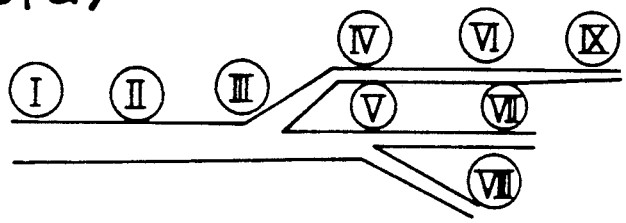
FIGS. 3(a), 3(b), 3(c), 3(d) and 3(e) show various flow processes.
Figure 3B:
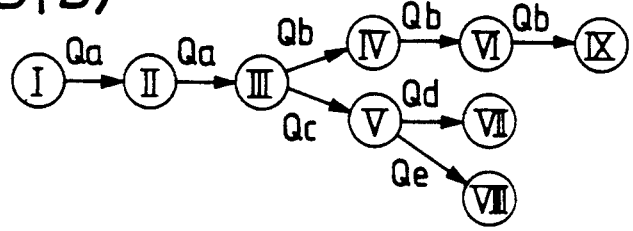
Figure 3C:
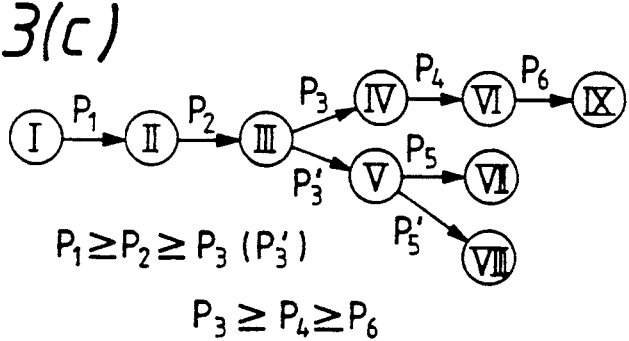

Flow Rate: The total inflow discharge and outflow discharge at a system branch point is always equal. As shown in FIG. 3 (b), the following relation always exists in each flow rate ($Q_a$ to $Q_e$:$Q_a = Q_b + Q_c$, $Q_c = Q_d + Q_e$), and if the total outflow discharge is smaller than the inflow discharge, an abnormality that causes a leak exists on the upstream side of the discharge flow rate detecting point (behind the branched point) is detected. If the inflow flow rate is smaller, use of abnormal mixtures of other liquids from an external system can be detected. Pressure: The pressure detection value on the upstream side due to the pressure loss attirbuted to the fluid flow speed (restricted to systems that do not use pumping action) is always larger than the pressure detection value on the downstream side. As shown in FIG. 3(c), the following relationships exist:

$P_1 \geq P_2 \geq P_3 (P'_3)$, $P_3 \geq P_4 \geq P_6$. If these relationships did not exist, the direction in which liquids flow would be abnormal. Thus, the flow rate must be checked, and information on the anomaly must be prepared.

Figure 3D:
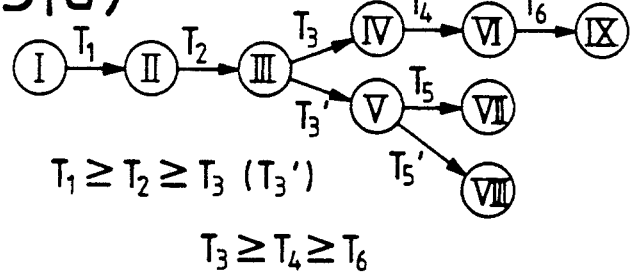

Temperature: Liquid is needed for heat exchange in the flow process with an external system. In case of low-temperature liquid, heat flows in from an external system. For high-temperature liquid, heat is discharged to the external system. FIG. 3(d) shows the latter case. The following relationships exist:

$$T_1 \geq T_2 \geq T_3 (T'_3), T_3 \geq T_4 \geq T_6.$$

Heat: Even if the liquid used as a thermal medium did not exist, any temperature difference causes heat to be transferred thereby increasing the entropy.

Figure 3E:
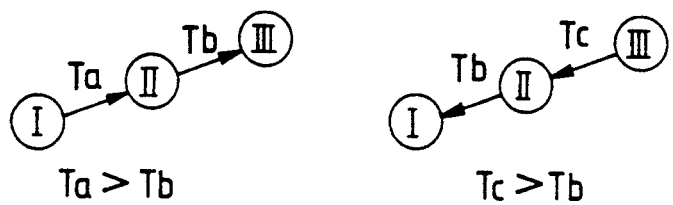

Monitoring the thermal stress caused by temperature difference between the interior and exterior walls is important in plant equipment that uses thick metal materials. As shown in FIG. 3(e), the transfer of heat can be estimated under individual operation conditions, and under certain conditions, the relationships $T_a > T_b$, $T_c > T_d$, or $T_a - T_b <$ set value, $T_c - T_d <$ set value exist. If this relationship did not exist, abnormal information would be generated.

B) Consider the correlation between process data (See FIG. 4).

Process data is essential for managing and controlling the final process quantity of plant production, and attention must be given to the important quantities in such correlations as the primary production process quantity for the amount of materials supplied, secondary production process quantity, specific parameters, and final process quantity As shown in FIG. 4(a)-(c), because two process items have such correlations as linear, disproportional, and saturation characteristics, dependent variable side process data Y (corresponding to the measurement value of independent variable side process data X) is indicated in the table by (d) with the correlation equation (when possible).

C) Consider the influence exertion route of the process data (FIG. 5).

When considering the process data, we must assume that there is other data related to the first process data. The assumed data should consist of the data group that forms the source of effecting the process data, and the data group that forms the destination of the effects as shown in FIG. 5.

D) Consider the operation terminal state (FIG. 6).

A close relationship exists between the operation state of a plant and each operation terminal, particularly when the plant is in an anomaly state. Therefore, attention must be paid to the operation state of each operation terminal in each normal/anomaly state. Each operation state is specified in a specific fundamental rule or in group. FIG. 6 shows the case wherein an individual operation terminal (valve A only) is checked, and the case where two operation terminals (valves A and B) are checked.

1-2 Concept for Extracting all Causal Relationships.

Though several concepts for extracting the fundamental rule of an object systems are shown, it is difficult to extract all fundamental rules efficiently, particularly for a large system. The following describes the concept for efficiently extracting all fundamental rules by using the above-described thermal power plant as an example.

When the above-described thermal power plant is divided in the production process as an energy carrier, the overall operation can be expressed as four main processes. In other words, the main processes consist of a air-gas-fuel system 41, a water-steam system 42, a turbine-electricity system 44, and a cooling water system 43, When such divided processes are allowed to correspond to the equipment composition shown in FIG. 7, the range enclosed by the respective dotted lines in FIG. 7 can be obtained. From the standpoint of the equipment composition, the water-steam system 42 includes a heat-exchange function achieved by the boiler 201 and a heat-consumption function achieved by the turbine 202. The main process in which the flow of substances (as an energy carrier) can be classified into several subprocesses which determine the flow. For the water-steam system 42, the equipment is divided into a low-pressure heater group, high-pressure heater group, and a boiler turbine. Further, the subprocess includes a group of equipment used to perform a charged work. This group is considered a uni-process. In the high-pressure heater group, an individual high-pressure heater is also considered a uni-process. Therefore, the entire power generation plant can be understood from one side surface by dividing the process into equipment operation-terminal levels at the plant. Moreover, the equipment for the high-pressure heater includes a high-pressure heater, outlet valve, inlet valve, bypass valve, and bleed valve.

Therefore, all fundamental rules can be efficiently extracted by precisely classifying the entire thermal power plant into a main process, subprocesses, uni-processes, and equipment, and by successively extracting the casual relationships between a precisely classified level or levels in terms of major and subordinate relationships.

FIG. 8 shows an example of a fundamental rule extracted in respect of the high-pressure heater group of the water-steam system, the correspondence between the divided system processes, an example of the extracted fundamental rule, and the concepts (A-D) for extracting the rules described in FIGS. 3 to 6.

Example 1: Fundamental Rule of Equipment Level (Intrinsic for Equipment)

This is related to the state of operation terminal in fundamental rule extraction group D, and the specified condition that a heater bleed valve is always in the correctly opened state during normal plant operation.

Example 2: Fundamental Rule (Between Equipment)

This is related to the state of operation terminal in fundamental rule extraction group D, and the specified condition that the opening/closing states of the heater's outlet valve and inlet valve are the same to establish the correlation between the equipment used in one high-pressure heater set. When a time difference (that can be ignored in the opening/closing states of both valves) exists, processing to eliminate such time difference is executed.

Example 3: Fundamental Rule of a Single Process Level (in a Single Process)

This is related to the state of operation terminal in fundamental rule extraction group D, further related to the flow direction of process A, with the condition that the inlet and outlet valves are correctly opened and a bypass valve is correctly closed during normal plant operation, or the inlet and outlet valves are correctly closed, and the bypass valve is correctly opened for the anticiapted abnormal plant operation. i.e. a heater bypass operation is specified. In the latter case, the specified condition is that the feedwater flow rate at the heater outlet is equal to the feedwater flow rate at the heater inlet (at a constant water level in the heater).

Example 4: Fundamental Rule of Single Process Level
(Between Single Processes)

This is related to the flow direction of the process in fundamental rule extraction group A, and the specified condition that the feed water temperature at the heater's outlet is lower than the feedwater tamperature at the heater's outlet in the next stage (slip stream side) and with the specified condition that the feedwater pressure at the heater's outlet is higher than the feedwater pressure at the heater's outlet in the next stage. These rules are based on the heat exchange and flow passage pressure loss in the feedwater line system near the high-pressure heater.

Example 5: Fundamental Rule of Subprocess Level (in Subprocess)

This is related to the flow direction of the process in fundamental rule extraction group A, and the specified condition that the sum of the bleed flow rate of a high-pressure heater group is equal to the drain flow rate of the final stage heater with a constant water level in the heater. This is also related to the correlation between the process data in fundamental rule extraction group B, and the specified condition that the total rising value of feedwater temperature in each high-pressure heater exceeds a certain set value, and the fact that total heat exchange in the high-pressure heater group is correct when considering the heat balance from one side surface.

Example 6: Fundamental Rule of Subprocess Level
(between Subprocesses)

Nothing is specifically specified.

Example 7: Fundamental Rule of Main Process Level
(in Main Process)

This is related to the correlation between the process data on fundamental rule extraction group B, and the specified condition that a linear relation exists between the feedwater flow rate at the outlet of the high-pressure heater and the main steam flow rate, and that the relation between water and steam in the water/steam process is monitored in terms of plant performance.

Example 8: Fundamental Rule of Main Process Level
(between Main Processes)

This is related to the correlation between the process data on fundamental rule extraction group C, and the specified condition that power generator output in a plant that permits heater cut operation may increase by 5% during operation. This means that in a different process, the correlation between the main data on the plant is changed under certain operation conditions.

Though several kinds of examples related to high-pressure heaters are listed, it is not necessary to specify the rule in which the difference between different divided processes and that between similar processes is not distinct or superposed.

Each fundamental rule extracted in the above-described procedure is organized in a summary table shown in FIG. 9. These rules are stored in the fundamental rule section shown in FIG. 1. FIG. 9 shows part of the fundamental rule extracted as shown in FIG. 8, and the correlation between the process data and related process data is recorded (in the form of a definition table) as a set of information. For example, rule R1 in the figure is the described in '1' in FIG. 8. This content describes high-pressure heater bleed flow rate I2A master trip delay set signal I4D alarm reset signal I5D, and generator output signal I3A (which are confirmed as process data related to heater bleed valve opening degree signal I, and are abnormal process data to be monitored when I2A or I3A is larger than each prescribed value. When I4D and I5D are in the reset state, normal operation is determined. Rules R2 and R3 are the contents of steps 7 and 3—3 in FIG. 8.

Both are two independent rules determined in relation to the high-pressure heater outlet feedwater flow rate I4'A. In rule R2, this rate is described as main steam flow rate I5A, while main steam pressure I6A and main steam temperature I7A are the related process data to be monitored. The following relationship exists in this case: $|I4A - I5A \times I6A \times I7A| \leq C4A \times I3A$. Here, C4A is a constant. In R3, it is described as high-pressure heater inlet feedwater flow rate I8A, while high-pressure heater water level I9A is the related process data to be monitored. In this case, the following relation exists: $|I4A - I8A| \leq C9A \times I9A$ (C9A is a constant). Though not described in FIG. 9, other fundamental rules in FIG. 8 are described in relation to the process data.

According to such fundamental rules, the table shown in FIG. 9 is searched according to the data name sent through signal line 11 shown in FIG. 1. The related process data (written in relation to the process data and correlation established between the process data) is then read and output to signal line 3.

II Database 26

Figure 2:
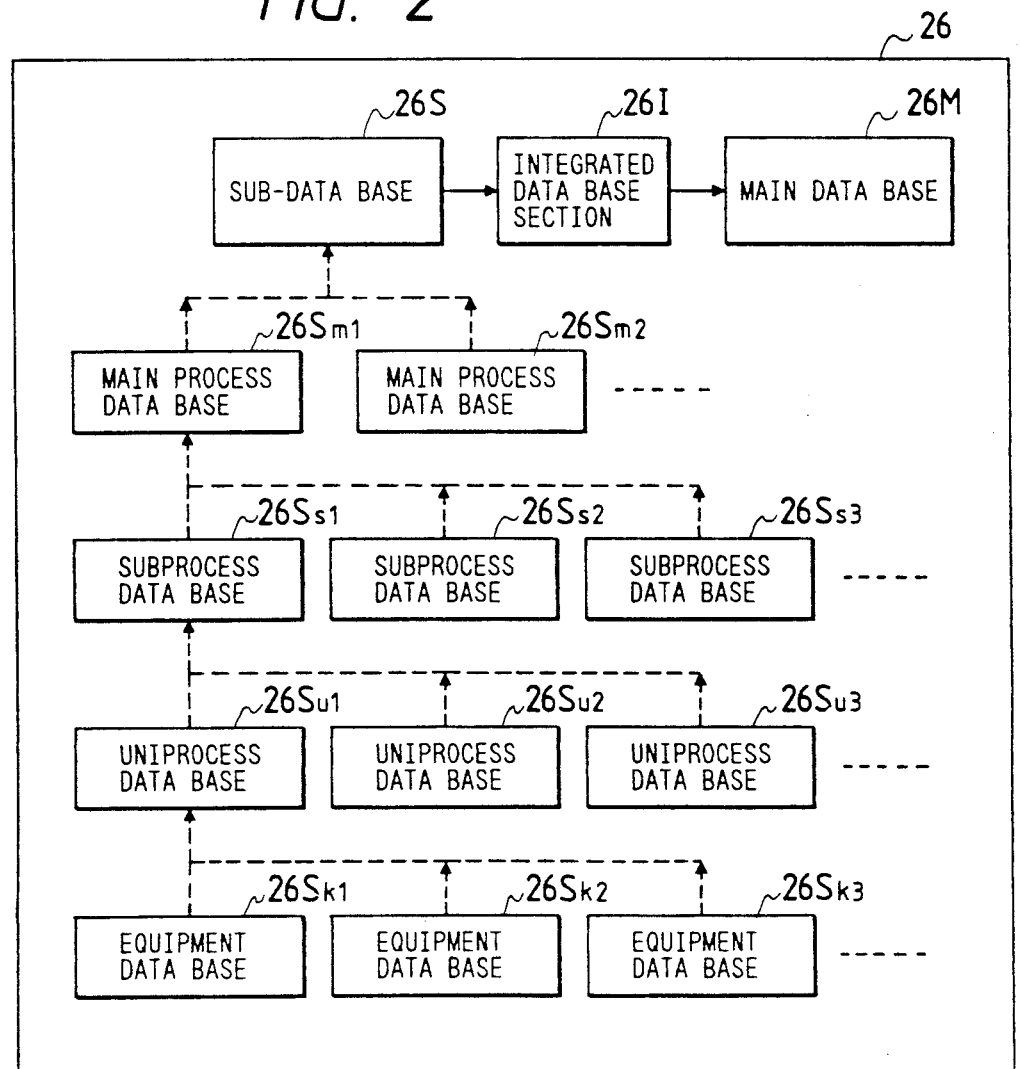
FIG. 2 shows a detail of the hierarchy of the database.

FIG. 2 shows the structure of the database 26. The database is basically constructed to enable the effective use of the data. Thus, it is important to have a data arrangement from which data can be easily extracted. The structure of this device is determiend as being hierarchial, corresponding the the system configuration of the object system and control device configuration (in relation to the preparation procedures for fundamental rule section 24).

The database may use a double structure of a main database 26M and a sub database 26S. This is based on the fact that database 26 is used as the data source of an expert system, etc., and an inference engine based on the supplied data contents. The database is also used online to control the object system during operation according to the results of inference processing. In other words, the database used the double structure of the main database 26M for the inference engine and sub database 26S for checking the data content offline. The main and sub databases 26M and 26S have the same contents when operation is started, if the operator determines that the database contents require correction based on experience acquired through actual plant operation, the operator must access the contents of the sub-database 26S to correct the data. Consequently, the contents of both database will gradually become different. When the number of different data items exceeds a certain number or the data containing important, parameters is corrected, the contents of the main database 26M are corrected to match the contents of the sub database 26S, while the inference accuracy of the inference engine is improved during online operation.

Generalizing part 26I is positioned between both databases 26M, 26S to count the number of different data items or to set the matching timing between the databases.

Although FIG. 2 shows the hierarchial structure of the sub database 26S as an example, the main database 26M also has the same structure.

The object system shown in FIG. 7 is based on a hierarchial configuration consisting of a main process, subprocess, uniprocess, equipment, and (in fundamental rule section 24) in relation to the rule extraction to prepare the fundamental rules, the information data belonging to the main process is stored in main process database which is divided into parts 26Sm1, 26Sm2.

The informational data belonging to the subprocess is stored in a subprocess database divided into parts $26S_{S1}$, $26S_{S2}$, $26S_{S3}$. Further, a uniprocess database and equipment database divided into parts 26SK1, 26Sk2, 26SSK3 have similar configurations. The reason why a hierarchial configuration was adopted is that some fundamental rules used in data edit processing must consider the flow directions of liquids in the process and the influence exertion route. Consideration must also be given to a process quantity because liquids determine the boundary conditions in the continuous lateral direction for each division in the hierarchial configuration, as well as to the effects exerted in the longitudinal and lateral directions of the hierarchial configuration. Therefore, the information can easily be incorporated when stored as individual items of data due to the advantage in understanding the overall concept.

III. Management History Table

Various data input accesses of informational databases are inevitable during long-term operation. Therefore, the informational database is known as a "growing system" because final completion is never achieved. Therefore if the operator and time for addition and correction work are not known after the initial preparation, the information in the database will become confusing and disordered, which will inhibit database use. For example, two or more items of informational data (for process data) may be stored in a database, and conflicting conditions may occur in the informational data. Otherwise, numerical discordance will occur. In fundamental rule memory 24, data edit processing device 23 and selecting device 25 can only select input data that does not result in such confusion. Consequently, correct selection is impossible. Furthermore, conflicting or erroneous data may be created due to operator mistakes. When such erroneous data is registered in the database, the erroneous data cannot be extracted and displaying these results outside cannot be achieved. If an error occurs in the results of inference engine processing based on data in the informational database, the presence of erroneous data is clarified by assuming that an error is in the data that forms the basis of the inference. In such cases, a data input management history table (shown in FIG. 10) must be used to search for the time point when the error ocurred in the above-described data input. All information related to such access controls as renewal access and confirmation access of data in the database are recorded in this table so that the history of the informational data can be determined. The data input access history for the informational database includes the name, qualification and other items of individual information about an operator who has accessed the system. It also includes the input knowledge-base information for each access operator, and the type of information (addition, deletion, change, etc.) used in the operation. Such important items of enviromental information as the date, day of week, load and atmospheric conditions may also be used. When the database structure has a double database structure of a main data base and a sub database, access control of data input is provided with individual records in both databases, and information related to the copying work between both databases also recorded in the history table.

IV. Data I/O Device

Data I/O device 21 is designed as a man-machine system that uses a screen (CRT), keyboard, etc., to read data from and write data to the database 26. It also displays and writes information to the management history table 27, transfers data to the data edit processing device 23, displays the contents of set fundamental rules, and updates the fundamental rules. One example of the display function is the simultaneous display of the contents of data before and after correction on the same screen. When the operator corrects the data, the corrected part is easily confirmed by its changing its colour by underlining, or by flashing indication. The guidance display during the operation-inhibited period prohibits change, even if the management history data can be displayed and the alarm display when the contents conflict with the displayed confirmation results, but not with the fundamental rule when additional information can be placed on the right to access the database by the operator.

V. Data Edit Processing Device

When informational data to be input into the informational database 26 is input using data I/O device 21, the input data is sent to the data edit processing device 23 through the user interface section 22. The data is read into the device 23 according to the fundamental rule (including the ID number for identifying the process data that makes up the data from fundamental rule memory 24). Moreover, the contents are compared to determine whether they match. As a result, when the contents match, they are determined to be normal. If the contents do not match, but there is no conflicting data the contents are "reserved". If the contents are conflicting, however, they are judged to be abnormal. For contents that are judged to be abnormal, the process data that makes use of the information is automatically rearranged. For a serial information composition (A-B-C) consisting of three process data items, the entire composition (BAC, BCA, CAB, CBA and ACB) is prepared and checked according to the fundamental rule. In other words, like the same process data, elements are rearranged, and only process data that does not conflict with the fundamental rule is sent to the next stage of processing. If there is no such conflicting data in the rearrangement, operation occurs and, the process data is sent to the next stages of processing in the form of the original information. In the next stage of transmission, the fundamental rule also serves as the basis for a check to be made at the same time, together with the information for which a normal determination has yet to be rendered.

VI. Selecting Device

The edit processing result of all data is input into conflict error selecting device 25. When the data is normal the data is sent as is to database I/O device 21. Reserved data and abnormal data are appended with the fundamental rule as the basis of determining reservation or abnormality, while abnormal information is prepared as a whole. Furthermore, the selecting function for rewriting normal, reserved and abnormal data into a form in which the operator of this device can easily understand is provided. This is the basic function of conflict/error selecting device 25. The information after selection is transmitted to I/O device 21.

The question of each component of the system shown in FIG. 1 will now be described, as will the effects that can be achieved when the operator executes operation database I/O device 21.

The operator of this device confirms the manually or automatically prepared knowledge-base information on a display device (such as screen (CRT) in database I/O device 21, then sends the knowledge-base information to data edit processing device 23 through signal line 6, interface section 22, and signal line 2. The function of user interface section 22 to achieve a conversion function for information processing signals and external peripheral equipment between the memory in data base 26. Bus 1, bus 7, etc., illustrate the flow of information, while a single-line bus or multiple cable lines may be adopted in a practical embodiment. Database device 21 is equipped with a display device (such as a screen (CRT), keyboard, and operating tools), and the information read by database I/O device 21 is displayed on the screen (CRT). The presence of the designated information input by an operator is also confirmed. After this confirmation, the operator transmits the information to data edit processing device 23 through bus 2. The flow of information described above is the same as the single data processing of each data processing of each data item or the batch processing of multiple data items.

After receiving the input information from database I/O device 21, data edit processing device 23 automatically reads the necessary fundamental rule through bus 3 from fundamental rule memory 24 or based on a start instruction issued from database I/O device 21. The required fundamental rule may be any of the fundamental rules that are transmitted through user interface section 22 and signal line 11, and prepared using an identification code attached to the process data that makes up the input information. For example, for input information $a_1 > b_1$ ($a_1$, $b_1$ process data), the necessary data is obtained according to the fundamental rule using al and all fundamental rules using $b_1$. When the fundamental rules corresponding to the above are three fundamental rules ($R_1$: $a_1 = K + b_1(K>0)$, $R_2$: $a_1 < C_1 + C_3$, $R_3$: $b_1 - c_10$), all three fundamental rules are extracted, then the data information $a_1 > b_1$ is applied to these fundamental rules. The rules that conform, those that do not conform, and those for which application is impossible are classified. The conforming rule is considered normal; the nonconforming rule is considered abnormal; and the rule for which application is impossible is considered to be reserved In this example, fundamental rule $R_1$: $a_1 = a_0 + b_1(a_0 > 0)$ is satisfied and is determined to be normal. The other two fundamental rules ($R_2$ and $R_3$) are reserved. Further, in this example, if the first input data information is $a_1 < b_1$, the judgement is as follows: $R_1$ (abnormal), $R_2$ (reserved), and $R_3$ (reserved). In this case, elements $a_1$ and $b_1$ are rearranged and compared with the fundamental rule again. Although the contents subsequently . match the above-described conclusion, the rearranged part is attached to the index information.

The following describes the editing of specific information by using bearing vibration as an example in the previously described thermal power plant. Based on the assumption input information Do (described below) exists, Ro is considered the corresponding fundamental rule.

Do: Information not applicable to edit processing, and which is currently in database I/O device 21.

$Do_{01}$: Preparation date (19 April 1988, 23.00)

$Do_{02}$: Person responsible for preparation (A) (third-class qualified)

$Do_{03}$: $T_{MS}$ 550° C., MV>LA (1988-4-19-23:00)

MV: Bearing vibration amplitude value

LA: Bearing vibration alarm set value $T_{MS}$: Main steam temperature

Fundamental rule Ro: Fundamental rule for MV of input information Do and rule considering the influence source related to "vibration generation (major abnormality) 1; high bearing lubricating oil temperature, exertion source 2; dangerous turbine speed, exertion source 3; excessive rate of generator coil temperature variation.

In this case, operator B (first-class qualified) checks whether information data Do (Yet to be subjected to the above-described edit processing) is true or false by using this device. Also, $Do_4$: Preparation date (20 April 1988, 23:00)

$Do_5$: Operator B (First-class qualified) (Considered part of the input information) (Edit processing)

Knowledge-base information items $Do_1$, $Do_2$, and $Do_3$ are prepared by operator A, then are extracted from database I/O device 21 by operator B for display on a CRT not shown in the figure. This display form conforms to the settings of individual devices. For example, when using the IF-THEN form:

IF ($T_{MS}$>550° C.), THEN (MV>LA), Input by (A−3) 1988-4-19-23.00.

Operator B confirms the contents displayed on the screen (CRT), then transmits the contents to data edit processing device 23. Then, a search is made for the corresponding fundamental rule (including process date) for each item of process data ($T_{MS}$, MV included in information $Do_3$).

A check is also made for conflicting data in the above-described information. Because Ro is the applicable fundamental rule in the example, the following expression is formed:

Ro: IF ($T_{BRG}$>$L_{TBRG}$ OR $LSC_1$<S<$LSC_2$ OR $R_{TGC}$>$L_{RTGC}$) THEN (MV>LA)

Here, $T_{BRG}$: Bearing lubricating oil temperature $L_{TBRG}$: Bearing lubricating oil maximum temperaturs set value $LSC_1$: Dangerous turbine speed minimum set value $LSC_2$: Dangerous turbine speed maximum set value S: Turbine speed $R_{TGC}$: Generator coil temperature variation rate $L_{RTGC}$: Generator coil temeprature variation rate maximum set value Because there is no fundamental rule associated with $T_{MS}$, knowledge-base information $Do_3$ (prepared by operator A) only refers to fundamental rule Ro. A check is then made on rule conformity. The matching results of fundamental rule Do and input information Do show that $Do_3$ does not conflict with fundamental rule Ro, but does not conform to it.

Information on normal, abnormal, and reserved conditions after the above edit processing work is transmitted to conflict/error selecting device 25 through bus 4, with the fundamental rule that forms the basis of judgement. The function of the selecting part is not affected even if the operation is executed in edit processing device 23. The function relieves the function's workload to divide the equipment in each processing mask.

Although the information transmitted as normal data to selecting device 25 may be received in singular form and transmitted to the next stage of processing, the information applied to the rearrangement is further applied to the comment addition processing to help the operator understand the index information. For this work, preparations are made in advance in the user interface section then operation is started by the index information signal. The information that conflicts with the contents of the fundamental rule is attached to the fundamental rule that forms the basis. The information to which information is attached is then prepared and transmitted to the database I/O device. Although the reserved information may be deleted (ignored) by the selecting function here, the information is attached to the fundamental rules as reference data for the operator before being transmitted to the next stage and displayed on a screen (CRT), where it is finally judged by the operator. For this reserved information, $Do_3$ (which is transmitted to conflict/error selecting device 25 through bus 4) and fundamental rule Do with the fundamental rule are set into pairs to form one unit of reserved information. The form of the reserved information is expressed as follows:

$Do_3$—PENDING
By rule (IF $T_{BRG} > L_{TBRG}$ OR
$LSC_1 < S < LSC_2$ OR
$R_{TGC} > L_{RTGC}$)

Note that when the results (abnormal or normal) are determined, the data attached with the reason (applicable fundamental rule) is transmitted to database I/O devide 21 with a form of expression form that is considered the same in these cases.

As previously described, the information arranged in the conflict/error selecting device is transmitted to the database I/O device through bus 5. The I/O device is set into the wait state so that the necessary information can be immediately displayed on the screen (CRT) immediately when requested by the operator (according to operator instructions). Therefore, sufficient memory capacity is important when considering the overall information of processing capacity.

Although the evaluated database is collected in data I/O device 21, some data stored in database 26 cannot be used as valid data. Thus, measures must be taken to prevent valid data from being deleted during this deletion operation. For this purpose, a deletion instruction signal for all the information is sent according to a method that gives consideration to preventing erroneous operation by the operator. For example, the information to be deleted must be confirmed through conversational processing using the screen (CRT) to prevent the operator from accidently deleting any edited information. Another measure taken to ensure correct deletion is that the data read into the database I/O device 21 is stored in a temporary memory area of the interface section for subsequent deletion after a series of operations. The information waiting in the database I/O device 21 (as instructed by the operator) is displayed on the display device (i.e. the screen (CRT) and matched with the information read and temporarily stored at device initialization. For normal data, the same data is displayed in the display area is different from the original data, this part and the fundamental rule are simultaneously displayed in the display area before and after correction. If part of the data is different from the original data, this part and the fundamental rule are simultaneously displayed to help the operator determined the actual differnces. The operator checking the displayed contents executes an operation on the device side to confirm that confirmation has been completed in principle, determines the correctness of storing the data in the database, then stores the data in the database. To reduce the operator's workload, the data can be automatically stored in the database when the operator determines that the data is information related to a simple subject.

To enable the operator to complete the above opearations, such basic and required operation tools as those for addition, deletion, change, storage, and reading must be provided in the I/O device of the database.

The information after data editing and selecting is stored in database I/O device 21, and is displayed for confirmation as being "stored" or "deleted" by the operator. For reserved information, operator B determines the correctness of storing data in the database when the check results obtained through database I/O device 21 does not conflict with the fundamental rule, but which were not determined as being normal. When operator B is qualified to determined whether the information is to be stored in the database, he/she can also make this determination for reserved information. Note that there are many cases where the check results are reserved among the set of fundamental rules, while the degree for operator qualification is based on the operator's ability to make the proper decision in such cases.

For example, if operator B is informed that no casual relationship exists between the rise in main steam temperature and the bearing vibration amplitude value, the reserved information can be deleted.

When operator B determines that information Do is to be stored in the database and this storage operation is executed, data $Do_3$ is stored in the database, while items of information $Do_3$–$Do_5$ related to the operation are recorded in the management history table 27 (FIG. 10) through bus 9. The operator's name, qualification ($Do_5$), content of information before and after correction (information, date $Do_4$), load of preparing information, and any important items of enviromental data (if prepared) are recorded in the management history table 27. This table can also be used to prepare a summary table by using the database access order and operator sorting function so that the history information can be read later as required. In this example, after operator B stores the reserved information Do in the database, then is informed a week later that a judgement error was made, the management history table 27 can be opened to delete the contents of processing stored in the data base. Note that one term is added to the history term in the management history table when the data for actual information stored in the database is deleted.

Therefore, only the history of the changed part (from the original database) is batch-controlled so that when information in the database is corrected, the management history table 27 is opened to compare each item of information before and after data correction. At this time, the operator confirms the information to be deleted, then the specified deletion is executed. In this way, the operator can access the database. Although the management history table 27 enables the contents to be displayed for confirmation, the contents cannot be changed. This is because management history is necessary for data correction. If the history could be changed, for example, it would become difficult to determine the established guidelines for correcting data in the informational database. As a result, all edited data in the database would have to be rechecked. Thus, when the database contains a large volume of data, such management is essential for maintaining the reliability and integrity of the data contents.

The following method is used to display information in the career management table onto the screen (CRT) of the database I/O device 21. According to this method, whether the plant operation state matches the related knowledge-base information on the database can be easily and visually determined. In other words, the processing system diagram 70 designated by the operator is displayed on the screen (CRT) as shown in FIG. 12. After the type of process quantity to be observed is designated and the position in the designated system is specified, the process quantity can be specified. Searching for recorded information in parameter oriented form can be done by real-time display on the screen (CRT) of the knowledge-base information that contains the specified process quantity (as composition elements) and which is stored in the management history table 27. This method can also be commonly used with a selection system that uses a mouse to enter characters. Moreover, the operator can easily understand the information through the color-display of the high or low usage frequency of data in a specific process level system diagram, based on the number of times that a process quantity (of knowledge base information) has been used. In this case, such usage can be better understood by the operator when a graphics display is set according to an arbitrarily specified number of times of use.

The following desribes the portable performance of information in the management history table 27. Although the need for information recorded in the management history table 27 is considered essential, this requirement is basically satisfied by displays enabled through the man-machine section of the data input control system. This recorded information is very important in terms of helping the operator use and operate the informational database over long-term plant operation, and to evaluate successful plant hardware operation. Management is provided so that when the principles of plant operation or technical level of the operator are examined, this information can be easily extracted so that the contents can be checked.

Therefore, such equipment as a floppy disc drive mechanism, memory read and write mechanism, a screen hard copy mechanism, and a mechanism for copying onto IC cards or ID cards must be provided.

To extract the knowledge-base information in real time and to read out the above recorded information to an external device, each item of information has an external device, each item of information has an individual identification code. Information is extracted according to the index of information recorded according to the corresponding assortment of periods, operator qualifications, types of operations, and operating terminals. In this operation, an input sequence of entering the required date, name qualification, terminal used, and type of operation for each operation is provided. Thus, operation can be executed by simply monitoring the establishment conditions of each type of assortment.

Figure 11:
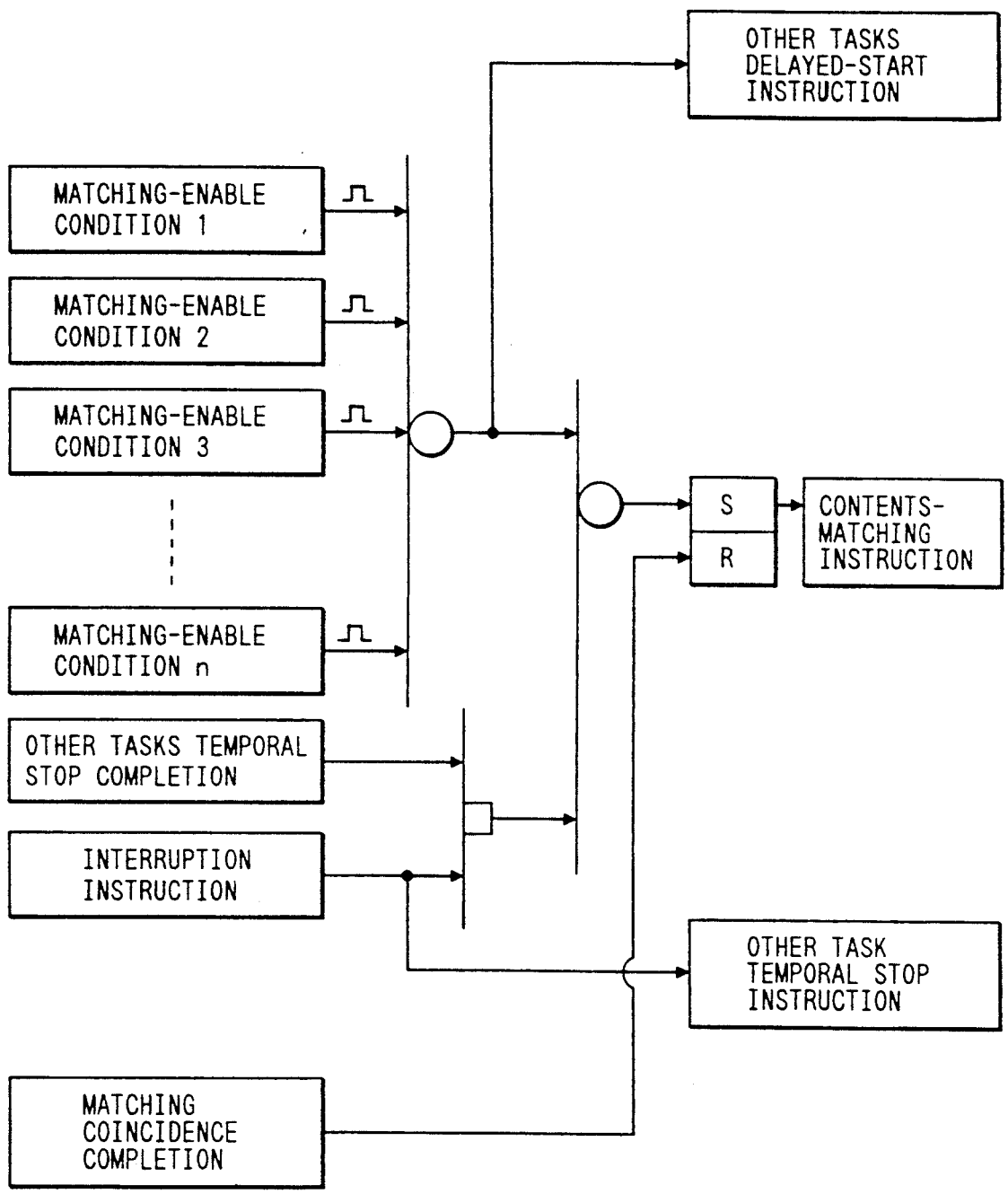
FIG. 11 shows the matching-enable conditions for main and sub data bases.

In database I/O device 21, data $D_{o3}$ (to be stored in database 26) is stored in data base 26 and management history table 27. The old data is deleted. In this case, the operator adds and deletes the information in database 26 (in FIG. 2) in an off-line mode for sub-database 26S because the data is not necessarily to be used in inference processing, etc., immediately after being stored in the data base. Data $D_{o3}$ (in the sub-database) is stored in the bearing system uniprocess database section of the database. This is because the database structure is that of the bearing system uniprocess as one process in the hierarchial division at each plant process level. The usage frequency of the knowledge-base information is also considered when bearing vibration is generated. In other words, when bearing vibration is generated, a similar vibration tends to occur in the contiguous bearing system in many cases. When considering the maintenance of the entire bearing system, the acquisition of information related to multiple bearings is desired. Thus, when the bearing system uniprocess batch-extracts information from the database of the subprocess (including higher-level bearing systems), the mutual correlation and casual relationship be easily understood. Furthermore, when the main database has the same structure as that of the above sub-database, the main database is used to provide internally used information, while the sub-database is used to complete stored information. In this case, the main database is used online during plant operation, while the sub-database is used offline during plant operation. Thus, the storage and utilization of information can be clearly and rationally divided. In this type of arrangement even if erroneous information is input into the sub-database, the erroneous information can be corrected. For example, previously input contents can be deleted up to when the sub-database contents are copied into the main database. More specifically, a qualified operator should check the management history table after completing the preceding copying work immediately before copying the contents of the sub-database to the main database. More effective database processing is also afforded by the following: .

a) Before accessing the informational database, qualification is checked by using a magnetic card or an IC card, then data is entered by using a portable and simplified input device. The manufacturer who prepared the informational database device as the supply source of the knowledge-base information transmits the data over a transmission line.

b) Even, if a matching-enabled condition for both the main database and sub-database is not satisfied, the operator must match the contents of both databases based on this accidental occurance, and decide not to execure inference calculation using the knowledge-base information of the main database. A function for interrupt processing that ignores matching-enabled conditions may be provided. As shown in FIG. 11, a contents-matching instruction is issued from each interrupted database, and the task of registering other knowledge-base information in the database temporarily stopped. Only where the stop operation completion condition and AND condition of the interruption instruction are satisfied, and both data contents allowed to be matched. At the same time, if a delayed-start instruction is issued to prevent other tasks from being started during the matching work, and to obtain the necessary time for matching. The contents-matching instruction that was transmitted once is held until the matching coincidence completion is satisfied.

Figure 13:
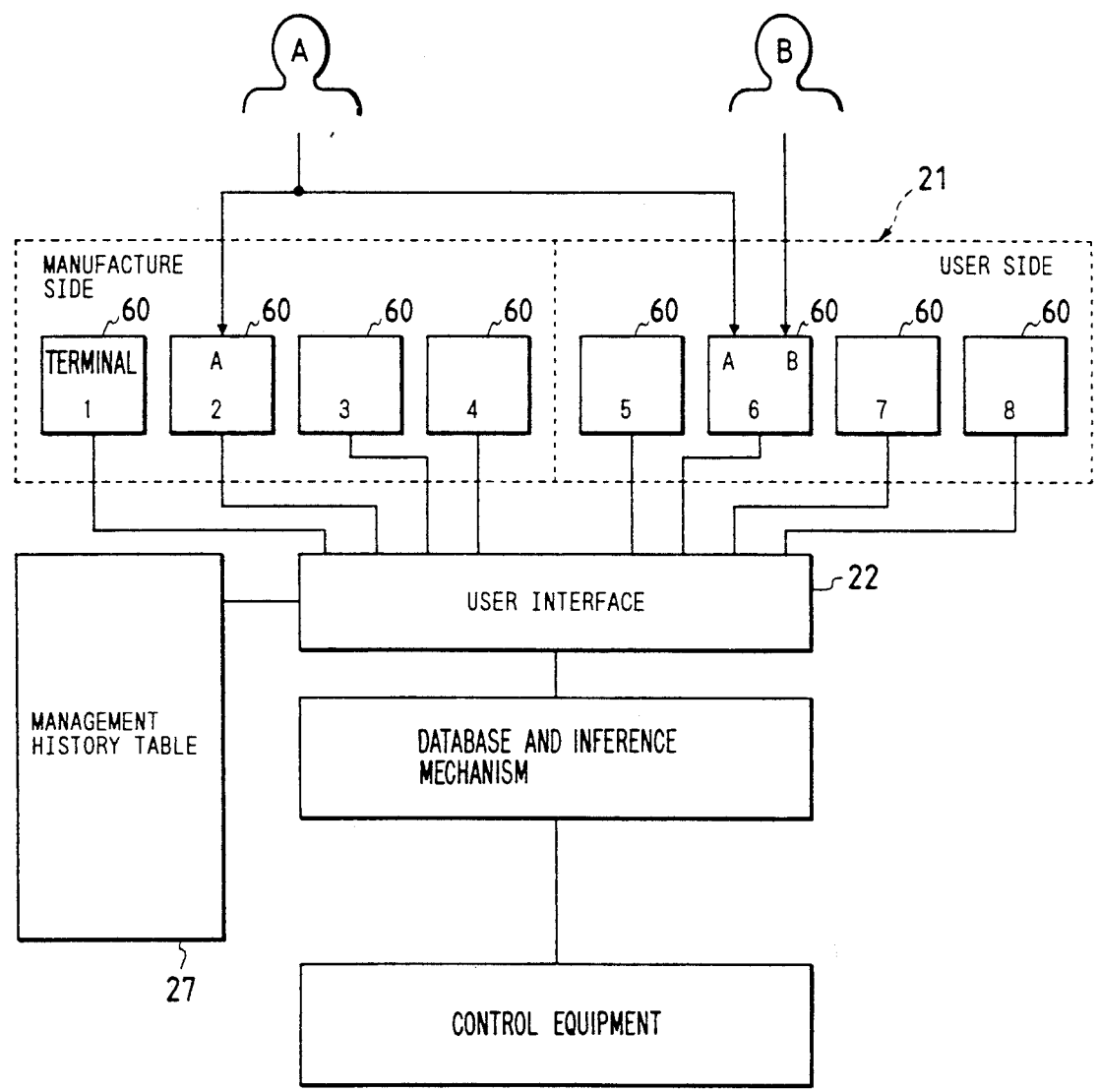
FIG. 13 shows schematically how access to the database is controlled.

C) When the degree of difference between the registered contents and main database contents used for operation increases due to addition, correction, or other operations involving the knowledge-base information in the sub-database, the operator must confirm this degree of difference. Therefore, the contents of both databases are compared, and the different parts are displayed on the screen (CRT) or output to an external output device, etc. The method of outputting the order, range, and form of data may be in real-time sequence, at a specific process level, or in a form divided into right and left parts on the screen (CRT). By assuming the above-described difference between both databases, the plant operations ranging from the inference engine to the operation terminal can be simulated, using the knowledge-base information in the sub-databases. Therefore, the response of a plant processing can be confirmed in advance by using only the sub-database contents related to control system operations involving the operation terminal according to the knowledge-base information in the main database.

d) Qualified operators having the right to access the informational database classified as A and B. "A" refers to a qualified operator on the manufacturer side of this devide; "B" refers to a qualified operator on the user side. As shown in FIG. 13, operator "A" can use any of the terminals 60 (1,2,3,4,) installed on the manufacturer side during preparation or testing or to enter the basic required knowledge-base information into the device. Operator "A" can also use any of the terminals 60 (5,6,7,8,) on the user side (after delivery) for instruction-assisted technical servicing. Conversely, a qualified operator B on the user side can only use one of the terminals 60 (5,6,7,8,) on the user side. Restrictions are also placed on the applicable ranges of database access changed by "A". Because various restrictions are placed on the terminals used and the range of database access, operators A and B must work on the respective manufacturer and user sides, and must generally work with the divided sections inside. Since the operator's role in management in each section is limited, and because a mutual relation is established, the installation site of each terminal 60 must be the same in each section.

FIG. 14 shows an example of the registration form for entry into the informational database by an ooperator using the database input control system.

When a qualified operator having the right to accesss the database observes vibration V due to a drop in plant equipment bearing oil pressure (P) at time T=To, and the related contents are registered as knowledge-base information in IF-THEN form, subject A(P) an subject C(V) are registered as A(P)→C(V) in the database (in hierarchial form at the subprocess level) with the sufficient and required conditions. After item $T_1$ elapses, a qualified operator having the right to access the database observes vibration V due to a rise in the plant equipment bearing discharged oil temperature (T). If the related contents are registered as knowledge-base information in IF-THEN form, this information is then registered in the database by adding contents B(T)→C(V) to the above-described knowledge-base information A(P)→C(V). In other words, registration is done using A(P) or B(T) as the sufficient condition and C(V) as the required condition. To register data in the database, it must be recorded in a form that considers the coordination between individual elements that make up the information. Otherwise, the data remains in the operation form used in the management history table. In the above-described example, at time T=To, the input knowledge-base information displayed on a (CRT) screen 0001) is converted into the database registration form (displayed on a screen (CRT) 0101), then is stored. At this time, the form corresponding to screen (CRT) 0001 is recorded in the career management table as is to prevent accidental deletion. Moreover, after time $T_1$ elapses and the operator is to input screen (CRT) 0002 into the database, the same condition at that applying to the required condition part C(V) is searched for in the database. Only the supposition condition B(T) is stored in the database as an element of knowledge-base information displayed on the screen (CRT) 002. In addition, the necessary programs are run to process this element in parallel to the other element A(P) stored with the registered-base knowledge information. Then, the form displayed on a screen (CRT) 0102 is converted in the database, and the element is registered. At this time, the data base memory location corresponding to screen 0101 is reset and replaced by screen 0102.

By adopting this invention, even unskilled operators can easily obtain the correct informational data. Moreover, if incorrect informational data is registered, the data can be easily corrected.

What is claimed is:

1. An operating control system for controlling operation of operation apparatus including a data input system for inputting data to a database having stored therein data which is used by said operating control system to control operation of said operation apparatus, each datum of said data indicating an operating relationship between operating parameters of said operation apparatus, said data input system comprising:

input means for permitting a user to input a new datum of said data to said database to change said control operation performed by said operating control system;

a memory for storing a plurality of fundamental rules, each fundamental rule indicating a predetermined relationship between said operating parameters of said operation apparatus;

processing means for investigating said new datum to determine if fundamental rules corresponding to operating parameters of said new datum are satisfied;

means for transmitting said new datum to said database when each of said fundamental rules corresponding to said operating parameters of said new datum is satisfied to thereby change said control operation performed by said operating control system;

means for preventing transmission of said new datum to said database if any one of said fundamental rules corresponding to said operating parameters of said new datum is not satisfied so as not to change said control operation performed by said operating control system.

2. A system according to claim 1, wherein said processing means is arranged to determine if there are no fundamental rules corresponding to said operating parameters of said new datum, said input means is arranged to associate a plurality of priorities to users, and said transmitting means is arranged to transmit said new datum having no corresponding fundamental rule only when said user has a predetermined priority.

3. A data input system according to claim 1, wherein each datum of said data indicating an operating relationship between operating parameters of said operation apparatus; and
means are provided for operating in place of said means for preventing transmission if said new datum has no corresponding fundamental rule and if said user has predetermined priority.

4. A data input system according to claim 1, wherein said input means also has a memory for storing both said old datum and said new datum.

5. A data input system according to claim 4 wherein said memory of said input means is arranged to store information indicating the identify of users who input old datum and new datum.

6. An operating control system for controlling operation of operation apparatus including a database system having a database for storing data which is used by said operating control system to control operation of said operation apparatus, each datum of said data indicating an operating relationship between operating parameters of said operation apparatus, and a data input system for inputting data to said database, said data input system comprising:
input means for permitting a user to input a new datum of said data to said database to change said control operation performed by said operating control system;
a memory for storing a plurality of fundamental rules, each fundamental rule indicating a predetermined relationship between operating parameters of said operation apparatus;
processing means for investigating said new datum to determine if fundamental rules corresponding to operating parameters of said new datum are satisfied;
means for transmitting said new datum to said database only when each of said fundamental rules corresponding to said operating parameters of said new datum is satisfied to thereby change said control operation performed by said operating control system; and
means for preventing transmission of said new datum to said database if any one of said fundamental rules corresponding to said operating parameters of said new datum is not satisfied so as not to change said control operation performed by said operating control system.

7. A database system according to claim 6, wherein said database stores data on a hierachical basis.

8. An operating control system for controlling operation of an industrial plant comprising:
a database for storing data relating to rules of operation of said plant, each datum of said data indicating an operating relationship between operating parameters of said plant, said data is used by said operating control system to control operation of said plant;
a guidance system for generating control information relating to said operating parameters of said plant;
a data input system including means for receiving a new datum of said data to change said control operation performed by said operating control system and means for defining a plurality of fundamental rules, each fundamental rule indicating a predetermined relationship between said operating parameters of said plant, said data input system being arranged to investigate if said new datum corresponding to control information satisfies fundamental rules corresponding to operating parameters of said new datum, and to transmit said new datum to said database when each of said fundamental rules corresponding to said operating parameters of said new datum is satisfied to thereby change said control operation performed by said operating control system; and
means for preventing transmission of said new datum to said database if any one of said fundamental rules corresponding to said operating parameters of said new datum is not satisfied so as not to change said control operation performed by said operating control system.

9. A method in an operating control system, which controls operation of operation apparatus, having a data input system which inputs data to a database having stored therein data which is used by said operating control system to control operation of said operation apparatus, each datum of said data indicating an operating relationship between operating parameters of said operation apparatus, said method comprising the steps of:
storing in said data input system a plurality of fundamental rules, each fundamental rule indicating a predetermined relationship between said operating parameters of said operation apparatus;
inputting a new datum of said data to said database to change said control operation performed by said operating control system;
investigating said new datum to determine if fundamental rules corresponding to operating parameters of said new datum are satisfied;
transmitting said new datum to said database when each of said fundamental rules corresponding to operating parameters of said new datum is satisfied to thereby change said control operation performed by said operating control system; and
preventing transmission of said new datum to said database if any one of said fundamental rules corresponding to said operating parameters of said new datum is not satisfied so as not to change said control operation performed by said operating control system.

10. A method according to claim 9, further including the steps of:
associating a plurality of priorities to users;
determining if there are no fundamental rules corresponding to said operating parameters of said new datum; and
if said new datum has no corresponding fundamental rule, transmitting said new datum to said database only when a user inputting said new datum has a predetermined priority.

11. An operating control system for controlling operation of operation apparatus including a device for inputting data to a database having stored therein data which is used by said operating control system to control operation of said operation apparatus, each datum of said data indicating an operating relationship between operating parameters of said operation apparatus, said device comprising:
means for permitting a user to input a new datum of said data to said database to change said control operation performed by said operating control system;

means for displaying said new datum;

means for displaying a result of a test, performed on said new datum, indicating whether said new datum satisfies each of a plurality of fundamental rules corresponding to operating parameters of said new datum so as to prevent transmission of said new datum to said database when any one of said fundamental rules corresponding to operating parameters of said new datum is not satisfied; and a memory for storing said plurality of fundamental rules, each fundamental rule indicating a predetermined relationship between said operating parameters of said operation apparatus.

12. A device according to claim 11, further including means for displaying any of said fundamental rules not satisfied by said new datum.

* * * * *